United States Patent
Creamer et al.

(10) Patent No.: US 7,092,500 B2
(45) Date of Patent: Aug. 15, 2006

(54) REMOTE TELEPHONY RECEIVER

(75) Inventors: Thomas E. Creamer, Boca Raton, FL (US); Peeyush Jaiswal, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 10/325,116

(22) Filed: Dec. 20, 2002

(65) Prior Publication Data

US 2004/0120486 A1 Jun. 24, 2004

(51) Int. Cl.
*H04M 11/00* (2006.01)

(52) U.S. Cl. .............................. 379/102.01; 379/102.06

(58) Field of Classification Search ........... 379/102.01, 379/102.02, 102.03, 102.04, 102.06, 93.02, 379/93.03, 93.08
See application file for complete search history.

(56) References Cited

U.S. PATENT DOCUMENTS

| | | | | |
|---|---|---|---|---|
| 4,656,318 A * | 4/1987 | Noyes | ................... | 379/102.04 |
| 5,198,806 A * | 3/1993 | Lord | ..................... | 379/102.04 |
| 5,276,444 A * | 1/1994 | McNair | .................. | 379/91.01 |
| 5,553,138 A | 9/1996 | Heald et al. | ................ | 379/413 |
| 5,596,628 A * | 1/1997 | Klein | ..................... | 379/102.02 |
| 5,633,925 A | 5/1997 | Handford et al. | ........... | 379/413 |
| 5,646,605 A * | 7/1997 | Leonaggeo et al. | ..... | 379/102.06 |
| 5,809,118 A * | 9/1998 | Carmello et al. | ...... | 379/102.02 |
| 5,894,508 A * | 4/1999 | Kim | ....................... | 379/102.04 |
| 5,901,284 A * | 5/1999 | Hamdy-Swink | .......... | 340/5.74 |
| 6,252,957 B1 | 6/2001 | Jauregui et al. | ............ | 379/413 |
| 6,320,945 B1 | 11/2001 | Honick et al. | ............. | 379/143 |
| 6,456,701 B1 * | 9/2002 | O'Brien et al. | .......... | 379/93.02 |
| 6,687,348 B1 * | 2/2004 | Cromer et al. | ......... | 379/102.04 |
| 2004/0047456 A1 * | 3/2004 | Lahutsky | ............... | 379/102.01 |

* cited by examiner

*Primary Examiner*—Stella Woo
(74) *Attorney, Agent, or Firm*—Akerman Senterfitt

(57) ABSTRACT

A method for implementing a remote receiver connected to a telephony network can include a call authorizer that can access remote receiver specific information, wherein the remote receiver specific information can include an authorization requirement. The call authorizer can receive a digitally encoded signal specifying an authorization code. Prior to a telephony connection being established between the remote receiver and an originating device, the call authorizer can determine whether the authorization code satisfies the authorization requirement. Responsive to this determination, the call authorizer can send a ringing signal via the telephone line to the remote receiver. The remote receiver can power an actuator within the remote receiver with a voltage from the ringing signal. The actuator can activate a device controlled by the remote receiver.

44 Claims, 7 Drawing Sheets

REMOTE TELEPHONY RECEIVER

BACKGROUND OF THE INVENTION

1. Technical Field

The present invention relates to the field of telecommunications and, more particularly, to a remote receiver controlled through telephony signals.

2. Description of the Related Art

A demand exists for remotely controllable devices such as garage door openers and security gates. One method of remotely controlling a device involves sending telephone signals to a device through a telephony communication system. For example, breaches in home security systems can result in a telephone call being sent to a monitoring station resulting in police notification.

Most conventional telephony devices, such as a device that receives calls from the security system, require a telephony connection as well as a power source. Utilizing an external power source can result in substantial costs relating to the installation of the requisite power lines. While internal power sources, such as batteries, can provide power without the necessity connecting to a power grid, internal power sources can require periodic replacement resulting in high maintenance costs. Regardless of whether battery power or external line power is used, these power sources can represent a potential source of failure for a given system.

Another concern for remote devices triggered through telephone lines relates to security. Only authorized users should be able to trigger a given remote activation device. Conventional authorization mechanisms require that a connection be established between a calling device and a called device. Then the called device will require an access key or code before the calling device is granted access to portions of the secure system. Unfortunately, because the authorization occurs after a connection is established, an unauthorized user is provided with an opportunity to attack or "hack" a restricted remote device.

SUMMARY OF THE INVENTION

The invention disclosed herein provides a method and a system for controlling remote receivers utilizing telephony signals. In particular, the invention can provide call authorization functions before a connection is established with a remote receiver. The call authorization functions can utilize pre-connection digital signals to relay information between a call originating device and a network element for authorizing telephony calls. Once the originating device has been authorized, a ringing signal can be sent to the remote receiver. A ring voltage associated with the ringing signal can be utilized by the remote receiver to activate a device controlled by the remote receiver. The results of such an activation can include, but are not limited to, the opening/closing of a device, such as a gate or a door, the locking/unlocking of the controlled device, and the starting/stopping of the remotely controlled device.

One aspect of the present invention can include a method for implementing a remote receiver connected to a telephony network. In the method, a call authorizer can access remote receiver specific information, wherein the remote receiver specific information can include an authorization requirement. In one embodiment, the remote receiver can transmit an authorization signal to the call authorizer that can specify information for modifying the authorization requirement. The call authorizer can receive a digitally encoded signal from an originating device that specifies an authorization code. In one embodiment, the authorization code can be responsive to an authorization request sent by the call authorizer to the originating device. In a further embodiment, the authorization request can include an encrypted key that the originating device can decrypt in order to generate a proper authorization code.

Both the authorization request and the authorization code can be conveyed across available pre-connection telephony channels. In one embodiment, the authorization request can be transported via a ringback channel. The ringback channel can be a back channel present between a telephony switch and an originating device though which a ringback signal can be relayed. The ringback signal can be an audio tone sequence that signifies that a receiving device is ringing. In another embodiment, the authorization code can be transported via a CNG channel. The CNG channel can be a forward channel present between an originating device and a receiving device through which a facsimile (fax) calling tone (CNG) signal can be conveyed. A FAX CNG signal, as defined by the T0.30 protocol, can be a 1,100 Hz signal continuing for 0.5 seconds and repeated every 3 seconds that signifies an attempt by an originating device to establish a fax call. The CNG channel can include a frequency range of approximately 900–1,300 Hz.

Prior to a telephony connection being established between the remote receiver and the originating device, the call authorizer can determine whether the authorization code satisfies the authorization requirement. If the authorization requirement is satisfied, a ringing signal can be sent via a telephone line to the remote receiver. A voltage from the ringing signal can power an actuator configured to activate a device controlled by the remote receiver. In one embodiment, circuitry within the remote receiver other than the actuator can be powered with the span power from the telephone line. In a particular embodiment, activating the remote receiver can alter the controlled device between a locked and an unlocked state. In another embodiment, activating the remote receiver can alter the controlled device between an open and a closed state. In yet another embodiment, activating the remote receiver can alter the controlled device between a started and a stopped state.

Another aspect of the present invention can include a method of utilizing a remote receiver including receiving a digitally encoded signal via a telephone line that specifies data for the remote receiver. The remote receiver can decode this digitally encoded signal. In one embodiment, the digitally encoded signal can specify an authorization code that the remote receiver can utilize to grant or deny access to remote receiver functions. In another embodiment, the digitally encoded signal can specify a remote receiver command that can be executed by the remote receiver resulting in a functional change within the remote receiver. In yet another embodiment, the digitally encoded signal can be a pre-connection telephony signal. In a particular embodiment, the remote receiver can digitally encode information specifying remote receiver data into a receiver signal and can transmit this receiver signal via the telephone line.

Additionally, the remote receiver can acquire a ringing signal via the telephone line and can power an actuator with a voltage from the ringing signal to perform a predefined function upon a controlled device. In one embodiment, the remote receiver can power internal circuitry within the remote receiver other than the actuator with span power from the telephone line. The predefined function that can be performed upon the controlled device can include a locking function, an unlocking function, an opening function, a closing function, a starting function, or a stopping function.

Another aspect of the present invention can include a system for remote controlling a device through telephony signals including a call authorizer and a remote receiver. The call authorizer can be communicatively linked to a telephony network and configured to send and receive digitally encoded pre-connection telephony signals that specify authentication information. In one embodiment, the call authorizer can be further configured to generate a digitally encoded signal specifying an encrypted key that must be decrypted by an originating device before a telephony connection is established between the originating device and the remote receiver. In another embodiment, the call authorizer can be a network element within a telephony network. In a further embodiment, the call authorizer can be a switch independent application.

The remote receiver can be communicatively linked to the call authorizer via a telephone line. Moreover, the remote receiver can contain a switching mechanism which can be powered by a ring voltage received through the telephone line. In one embodiment, the remote receiver can further include a receiver power generator configured to power the remote receiver utilizing span power from the telephone line. In another embodiment, the remote receiver can further include a command processor configured to alter at least one function performed by the remote receiver whenever the remote receiver is activated. In yet another embodiment, the remote receiver can include a security manager including security information about accessing the remote receiver. The security manager can be configured to convey a digitally encoded signal specifying at least a portion of the security information to the call authorizer.

Another aspect of the present invention can include a remote receiver including a signal processor communicatively linked to a telephony network. The signal processor can be configured to send and receive digitally encoded telephony signals specifying remote receiver information. The remote receiver can also include an actuator powered by a ring voltage received via a telephone line. The actuator can be configured to trigger a change within a controlled device when the remote device receives a ring signal.

In one embodiment, at least one of the digitally encoded telephony signals can be a pre-connection telephony signal. In another embodiment, the remote receiver can further include a receiver power generator configured to power the remote receiver utilizing span power from the telephone line. In an alternative embodiment, the remote receiver can further include a command processor configured to alter at least one function performed by the remote receiver whenever the remote receiver is activated. In yet another embodiment, the remote receiver can further include a security manager configured to perform authorization tasks within the remote receiver. In such an embodiment, at least one function within the remote receiver cannot be accessed without prior authorization being granted by the security manager.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for controlling remote receivers utilizing telephony signals. In particular, the invention can include a remote device communicatively linked to a telephony network via a telephone line. This remote device can perform functions such as opening/closing a device, such as a gate or a door, locking/unlocking a device, or starting/stopping a device. The functions performed within the remote receiver can be powered in part by a ring voltage received through the telephone line.

Additionally, the invention can perform call authorization functions before a ring signal is sent to the remote device. These call authorization functions can utilize pre-connection digital signals to relay information between a call originating device and a network element for authorizing telephony calls. Hence, the invention can assure through the call authorizer that only authorized parties can activate the remote receiver.

Figure 1:
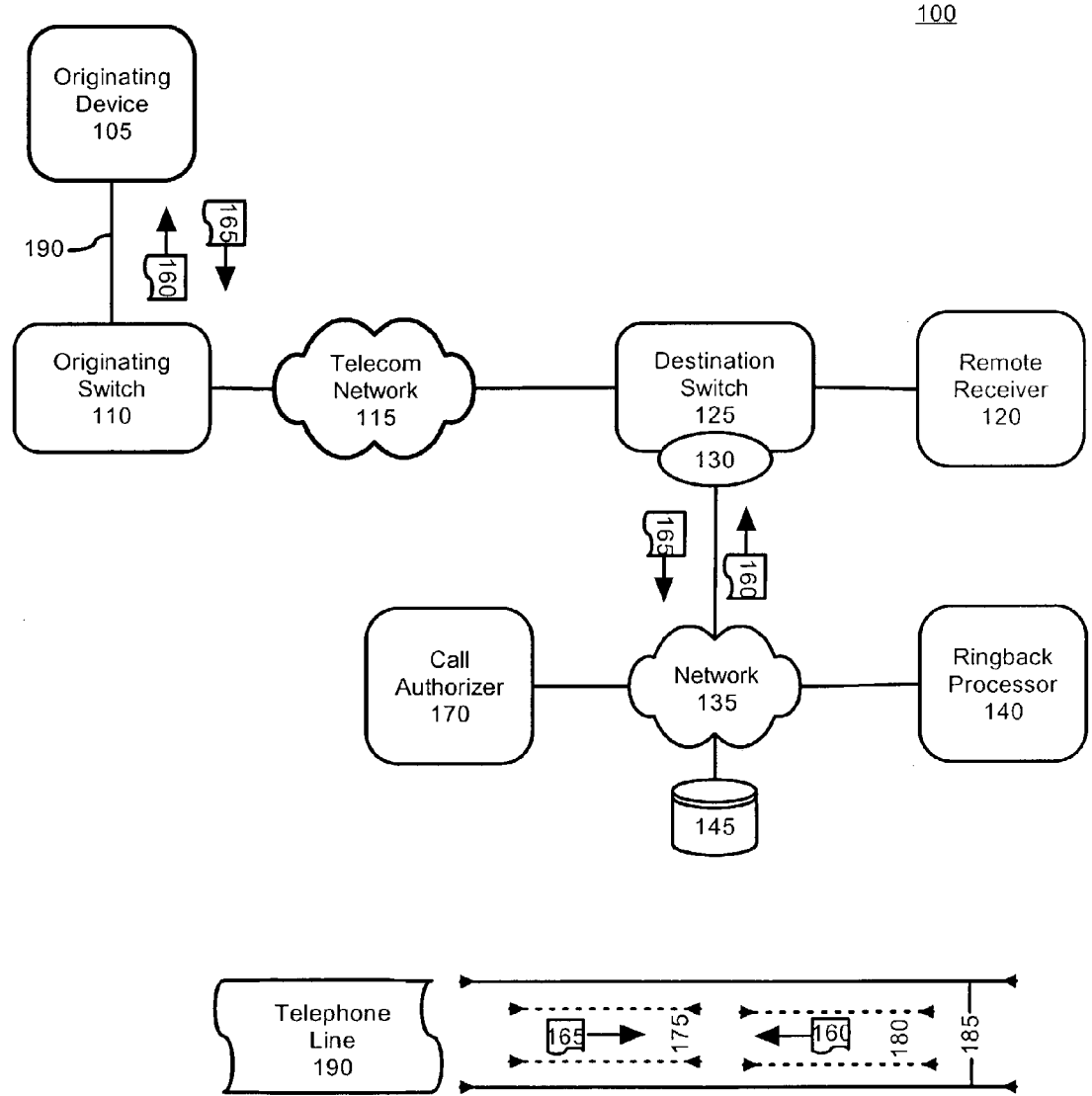
FIG. 1 is a schematic diagram illustrating an exemplary telephony system including a remote receiver in conjunction with a call authorizer in accordance with the inventive arrangements disclosed herein.

FIG. 1 is a schematic diagram illustrating a telephony system 100 which can include a remote receiver in conjunction with a call authorizer in accordance with the inventive arrangements disclosed herein. As shown in FIG. 1, the system 100 can include an originating switch 110, a telecom network 115, a destination switch 125, a call authorizer 170, a remote receiver 120, as well as a telephone line 190 showing a ringback channel 180 and a CNG channel 175. The remote receiver 120 can be a device communicatively linked to a telephony network via the telephone line 190 that is capable of triggering an operation within a controlled device responsive to a signal received via the telephone line 190.

The originating switch 110 can be a node within a telephony network that can facilitate the connection between telephony devices, such as telephones and other customer premise equipment. Notably, switches, such as the originating switch 110 and the destination switch 125, can connect customer premise equipment to the telecom network 115. Hence, the originating switch 110 can connect an originating device 105 to the telecom network 115. Similarly, the destination switch 125 can be a node within the telecom network 115 communicatively linking a remote receiver 120 to the telecom network 115. Since one switch can connect many telephony devices to a given network, both the originating device 105 and the remote receiver 120 can be connected to the same switch. Accordingly, embodiments can exist where the originating switch 110 and the destination switch 125 are the same switch.

The telecom network 115 can be any series of points or nodes connected by a series of interconnection paths capable of connecting the originating switch 110 to the destination switch 125. For example, the telecom network 115 can be a circuit-switched network included within the public switched telephone network (PSTN). In another embodiment, portions of the telecom network 115 can be a commercially owned proprietary packet-switched network with Voice over Internet Protocol (VoIP) capabilities.

The telephone line 190 can be a line that connects a telephony device (customer premise equipment) to the telecom network 115. Physically, the telephone line 190 can include, but is not limited to, such a medium as a twisted pair, a coaxial cable, a fiber optic cable, as well as a wireless connectivity pathway. The telephone line can carry span power, ring voltage, and data signals to attached customer premise equipment. Notably, the span power can be a constantly supplied power source capable of providing low voltage to customer premise equipment.

The data signals can be conveyed through a voice channel 185. This voice channel 185 can be a bandwidth segment, typically 64 kbps, utilized by a telephony network for a single voice connection. The voice channel 185 can operate within the voice band, wherein the voice band can include the frequency range of approximately 0 to 3,400 Hz, which is sufficient bandwidth to convey intelligible human speech. Ordinary telephone service is often restricted to the voice channel 185, while other services, such as a digital subscriber line (DSL) service, can utilize a broader frequency range.

A CNG channel 175 can include a frequency range within the voice band through which an authorization code 165 can be transmitted. While the CNG channel 175 is always capable of transporting a pre-connection FAX CNG signal, the exact frequency range available within the CNG channel 175 can vary according to filters placed within the telephony network which typically have a passband at or around 1,100 Hz. For example, in one embodiment, frequencies below approximately 300 Hz and above approximately 2,400 Hz can be filtered. The resulting CNG channel 175 can include the frequency range from approximately 300 Hz to 2,400 Hz. In another embodiment, all frequencies that deviate from the 1,100 Hz frequency (used by the FAX CNG signal according to T 0.30 protocol) by more than 200 Hz are filtered. Accordingly, the CNG channel 175 can include the frequency range from approximately 900 Hz to 1,300 Hz.

In one embodiment, signals within the CNG channel 175 can be digitally encoded by intermittently turning on and off a frequency of about 1,100 Hz, where an "on state" can represent a digital one, and an "off state" can represent a digital zero, or vice versa. In an alternate embodiment, signals within the CNG channel 175 can utilize a modulation technique with a base or carrier frequency of about 1,100 Hz. Furthermore, specific modulation techniques, such as phase key shifting (PKS) and frequency key shifting (FKS), can be used in particular embodiments of the invention. Still, digitally encoded signals can be generated using any of a variety of modulation schemes including, but not limited to, time division multiplexing, frequency modulation, phase modulation, amplitude modulation, and pulse code modulation. Accordingly, the present invention is not limited by the particular data encoding or modulation type. Rather, any suitable data encoding and/or modulation scheme can be used to carry information over the defined telephony channels.

The ringback channel 180 can include a frequency range within the voice channel 185 wherein at least one authorization request 160 can be conveyed to the originating device 105. The ringback channel 180 can be a back channel through which a ringback signal is ordinarily sent from a telephony switch to an originating device 105. The ringback signal is an intermittent audio tone that the originating device 105 receives after dialing a number, when the distant end of the circuit or the remote receiver 120 is receiving a ringing signal. While the ringback signal is typically an analog signal, the authorization request 160 can be a digital signal conveyed through the ringback channel 180.

The call authorizer 170 can be an application capable of performing call authorizations for at least one remote receiver 120. In so doing, the call authorizer 170 can relay authorization data to an originating device 105 via the ringback channel 180 and receive authorization data from the originating device 105 via the CNG channel 175. All conveyances of authorization data to and from the call authorizer 170 can occur before a telephony connection is established between the originating device 105 and the remote receiver 120. This telephony connection can be a voice channel through which typical telephony communications occur. In one embodiment, the call authorizer 140 can be a network element that interfaces with the destination switch 125 through a gateway 130. In another embodiment, the call authorizer 170 can be a stand-alone solution interfacing directly with the destination switch 125 without utilizing the gateway 130 as an intermediary. In yet another embodiment, the call authorizer 170 can be a program disposed within the destination switch 125.

The call authorizer 170 can utilize encrypted keys to determine if a connectivity request is to be granted. Any type of encryption can be used including symmetric key and public key encryption schemes. For example, the call authorizer can send an encrypted key to the originating device 105. This encrypted key can then be decrypted, utilizing a decryption key possessed by the originating device 105. The originating device 105 can then send an authorization code 165 as proof of successful decryption. Only those devices possessing an approved decryption key can construct an approved authorization code. The returned authorization code 165 can be utilized by the call authorizer 170 to determine if a connectivity request should be granted or denied.

In order to determine the necessary authorizations for a particular remote receiver 120, the call authorizer 170 can access a profile repository 145. The profile repository 145 can contain remote receiver specific information. In one embodiment, this information can be modified by a user of the remote receiver 120. The profile repository 145 can be a data store internal or external to the call authorizer 170. Additionally, the profile repository 145 can include different authorization requirements for different originating devices. For example, in one embodiment, when the originating device 105 is located within the same building as the remote receiver 120, no authorization may be necessary. Yet, authorization can be necessary within that embodiment for originating devices located outside the building in which the remote receiver 120 is located.

The network 135 can be any series of points or nodes connected by a series of interconnection paths capable of connecting destination switch 125 to the call authorizer 170 and transporting packet-switched messages between connected nodes. For example, the network 135 can be the Internet. Alternately, the network 135 can be an intranet utilized by a telecom carrier that owns the destination switch 125. In that case, the gateway 130 can be used to interface between the call authorizer 170 and the destination switch 125. In one embodiment, the gateway 130 can facilitate switch independent application programming by providing a set of open network application programming interfaces (APIs). These interfaces can translate standardized telephony commands to switch specific commands. Additionally, the gateway 130 can function as a layer of abstraction between a telephony network and an application, providing standardized routines to ease many programming tasks.

For example, in one embodiment, the gateway 130 can be a Parlay gateway capable of interfacing any Parlay compliant application to a Parlay compliant telecom network 115. In another example, the International Business Machines (IBM) Resource Manager, which is commercially available from IBM Corporation of Armonk, N.Y., can provide the call authorizer 170 value-added telephony services and functions. Hence, in a particular embodiment, the IBM Resource Manager can function as the gateway 130. In yet another embodiment, the gateway 130 can include JAVA APIs for Integrated Networks (JAIN) allowing the call authorizer 170 to be implemented as a switch independent JAIN compliant application.

In operation, the originating device 105 can place a call to the remote receiver 120 through the telecom network 115. The originating device 105 can send a connectivity request through the originating switch 110 across the telecom network 115 to the destination switch 125. This connectivity request can specify the calling phone number as well as the called phone number. Notably, when both the originating device 105 and the remote receiver 120 are connected to the same switch, the connectivity request can be handled directly by that switch, which can function as both the originating switch 110 and the destination switch 125. The destination switch 125 can then send an authorization inquiry to the call authorizer 170. The call authorizer 170 can utilize the profile repository 145 to determine that an authorization code is necessary before a connection with the remote receiver 120 is permitted.

Thereafter, the call authorizer 170 can construct an authorization request 160. This authorization request 160 can be conveyed to the originating device 105 via the ringback channel 180. Notably, the ringback processor 140 can be utilized to facilitate the transmission of the authorization request 160. This authorization request 160 can contain an encrypted key that the originating device 105 can decrypt. Upon decrypting the encrypted key, an authorization code 165 can be generated. The originating device 105 can transmit the authorization code 165 to the call authorizer 170 via the CNG channel 175. The call authorizer 170 can then grant or deny connectivity to the remote receiver 120 based upon the authorization code 165.

Should connectivity be denied, no ring signal will be sent to the remote receiver 120 and no activities will result. If, on the other hand, the call authorizer 170 grants connectivity, a ring signal can be sent to the remote receiver. This ring signal can include a ring voltage that can activate an actuator within the remote receiver 120 causing some operation to be performed. The operation performed can depend on the nature of the remote receiver 120 and the device being controlled by the remote receiver 120.

It should be noted that the call authorizer 170 can, but need not, submit an encrypted key to the originating device 105. In one embodiment, the call authorizer 170 can utilize a password encoded within the authorization code 165 to determine connectivity. This password need not be based on an encryption scheme. In another embodiment, no authorization request 160 need be sent from the call authorizer 170 at all. In such an embodiment, the originating device 105 can submit an authorization code 165 to the call authorizer 170 at or about the time when the connectivity request is submitted or shortly thereafter. In such an embodiment, any connectivity requests sent without an accompanying authorization code 165 can be automatically denied.

While in one embodiment the call authorizer 170 can convey data to the originating device 105 without assistance, in another embodiment, a ringback processor 140 can assist in these transmissions. The ringback processor 140 can be an application capable of receiving data and conveying this data as analog and digital signals over the ringback channel 180. The ringback channel 180 can be a segment of telephony bandwidth within the voice frequency range (approximately 0–3,400 Hz) reserved for pre-connection transmissions between a telephony switch and the originating device 105. Typically, an intermittent analog signal representing the ringing of a data source is sent along this ringback channel.

Still, according to one embodiment wherein the remote receiver 120 includes logic and/or information processing capabilities, the network element can forward pre-connection digital information received from the originating device 105 directly to the remote receiver 120, also using pre-connection signals as previously described. Accordingly, the remote receiver 120 can then determine whether to terminate a connectivity request by communicating with either the network element or directly with the originating device 105 through the telecom network 115.

Figure 2A:
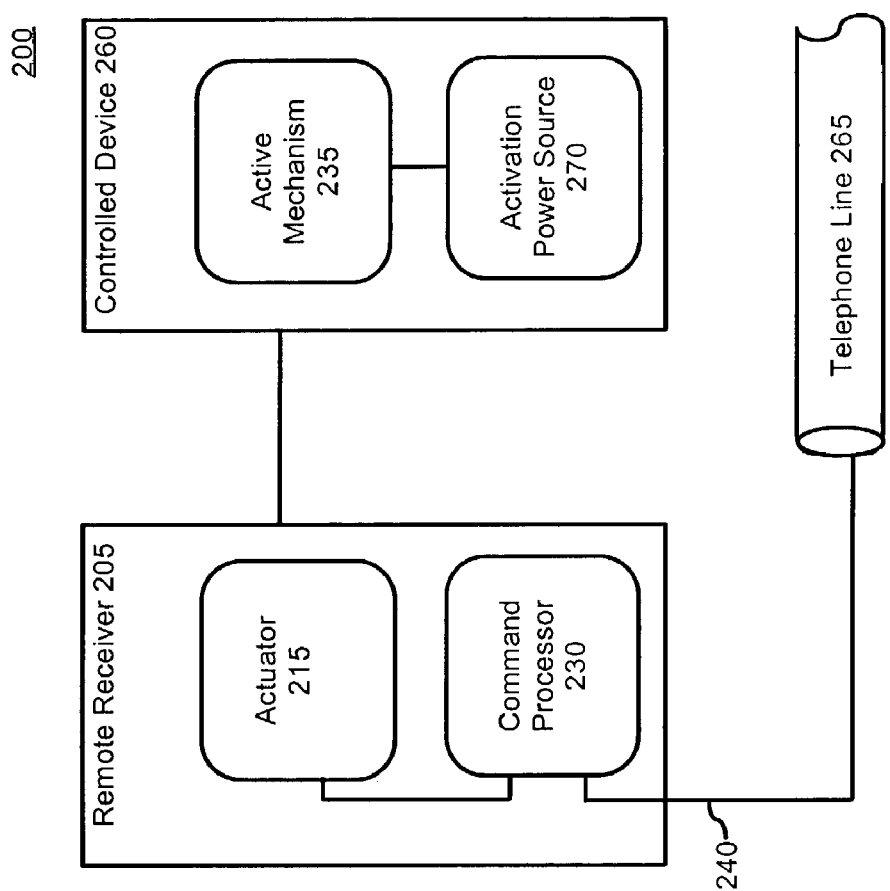
FIG. 2A is a schematic diagram illustrating an exemplary remote receiver in accordance with the inventive arrangements disclosed herein.

FIG. 2A is a schematic diagram illustrating a system 200 showing an exemplary remote receiver 205 in accordance with the inventive arrangements disclosed herein. As shown in FIG. 2A, the system 200 can include a remote receiver 205 with an actuator 215 and a command processor 230 as well as a controlled device 260 and a ring voltage conduit 240. The ring voltage conduit 240 can transport the ringing signal and accompanying ring voltage from a telephone line 265 to the remote receiver 205. Typically, the ring voltage provided by a central telephony office is 70 to 90 volts at 17 Hz to 20 Hz. This ring voltage can be utilized by the remote receiver 205.

In a basic embodiment, the command processor 230 can detect an incoming ring signal and route the ring voltage to an actuator 215. The command processor 230 need not immediately route the ring voltage, but can contain components, such as capacitors, that allow the ring voltage to be temporarily stored. Furthermore, in particular embodiments, the command processor 230 can receive data signals via the telephone line 265 that can contain remote receiver 205 commands. These data signals can be conveyed either before or after a telephony voice channel connection is established with the remote receiver 205.

The actuator 215 can be a mechanism within the remote receiver 205 that can put something in motion, such as an active mechanism 235. The actuator 215 can be powered by the ring voltage received through the ring voltage conduit 240. For example, the actuator 205 can be a switch, such as a solenoid, that upon receiving the ring voltage can be altered between two different states. Because in some embodiments, the command processor 230 can temporarily store the ring voltage, the actuator 215 can be activated either before or after a telephony voice channel connection is established.

The controlled device 260 can be a device connected to the remote receiver 205 that can perform some function triggered by the actuator 215. The controlled device 260 can include an active mechanism 235 and an activation power source 270. In particular embodiments, depending on the power requirements of the active mechanism 235, the activation power source 270 can be unnecessary. Instead, the actuator 215 can supply sufficient power to operate the active mechanism 235. For example, in one embodiment where the controlled device 260 causes a computer to be turned on or turned off, the active mechanism can be completely powered by the actuator 215. In another embodiment, where the controlled device 260 causes a gate to open or close, the active mechanism 235 can be triggered by the actuator 215, but can require power supplied by the activation power source 270 to move the gate.

It should be noted that the remote receiver 205 can be a implemented as an integrated circuit. Alternately, the remote receiver 205 can be a complex device containing many different mechanical and electronic components. For example, the remote receiver 205 can be integrated with the controlled device 260 and contain the active mechanism 235 and the supplementary activation power source 270. Furthermore, the remote receiver 205 can contain additional components and features other than those depicted in FIG.

2A. One such embodiment where the remote receiver 205 can include additional components is shown in FIG. 2B.

Figure 2B:
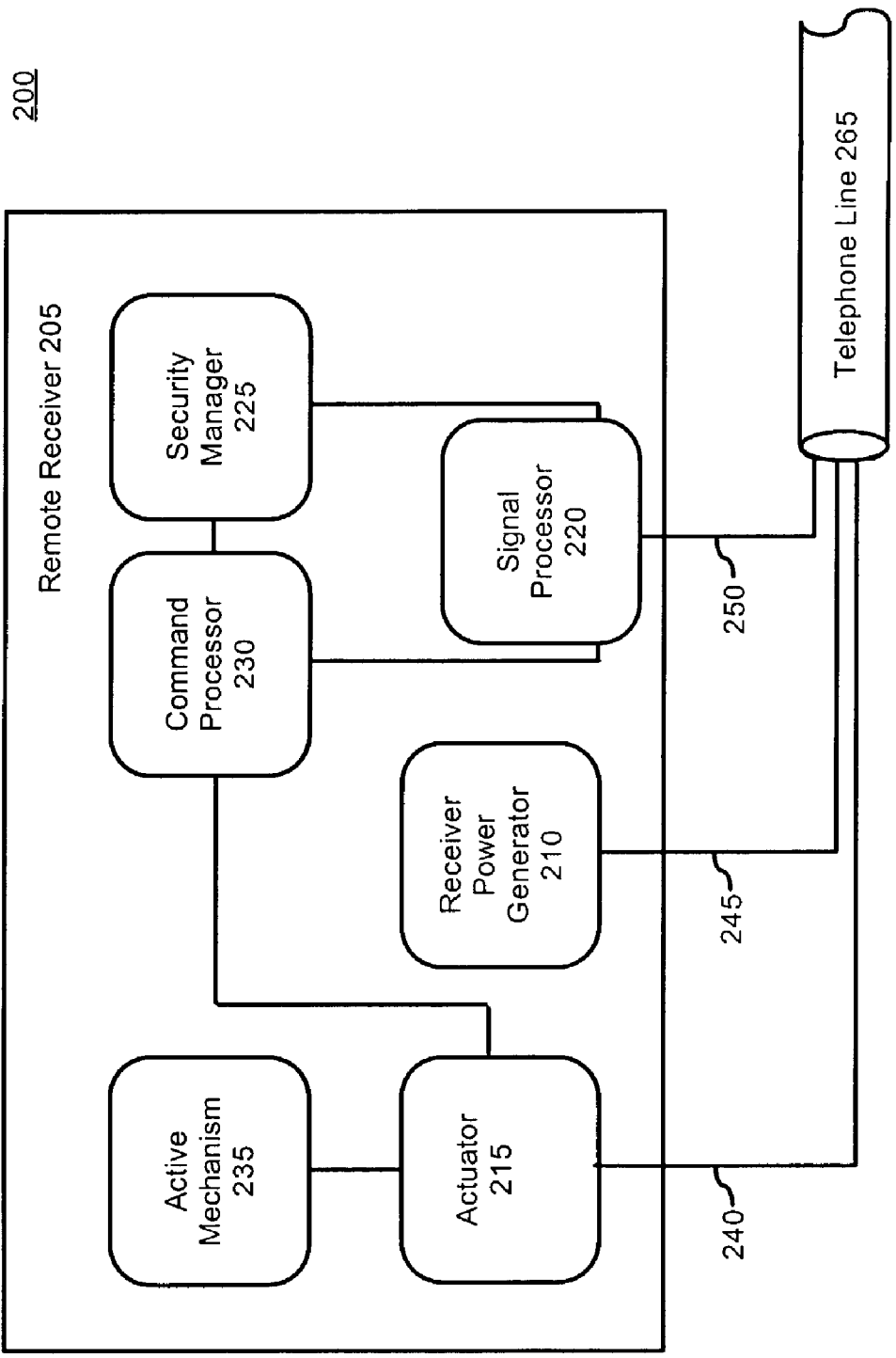
FIG. 2B is a schematic diagram illustrating another exemplary remote receiver in accordance with the inventive arrangements disclosed herein.

FIG. 2B is a schematic diagram illustrating a system 200 showing another exemplary remote receiver 205 in accordance to the inventive arrangements disclosed herein. As shown in FIG. 2B, the system 200 can include a remote receiver 205 with a receiver power generator 210, an actuator 215, a signal processor 220, a security manager 225, a command processor 230, and an active mechanism 235. The receiver power generator 210 can provide the remote receiver 205 with a constant power source so that memory can be retained and basic system processes can occur. In one embodiment, the receiver power generator 210 can be powered by a battery or an external power source, such as a wall outlet. In another embodiment, the receiver power generator 210 can receive power from the span power conduit 245. The span power conduit 245 can carry the constant power signal contained within a telephone line 265 provided by a central office to power low voltage needs of customer premise equipment.

The signal processor 220 can transmit and receive data signals to and from the remote receiver 205. For example, in one embodiment, the remote receiver 205 can receive a signal requesting current state information about the remote receiver 205 and can responsively generate a signal denoting the receiver's status. The signal processor 220 can contain the necessary components to encode and decode digital information within telephony signals. These telephony signals can be sent through a data conduit 250 within the telephone line 265. In one embodiment, the data conduit 250 can transmit signals through a voice channel having a frequency range of approximately 0–3,400 Hz. In another embodiment, the data conduit 250 can have additional bandwidth outside the voice channel, such as the bandwidth available to the data channel of a DSL line. Notably, the signal processor 220 can process both pre-connection telephony signals and post connection signals.

The active mechanism 235 can include the physical hardware that performs a function for which the remote receiver 205 is triggered. For example, in an embodiment where the remote receiver 205 opens/closes a floodgate, the active mechanism can include the gate, levers, and hydraulic components necessary to make the gate open/close. In another example, the active mechanism 235 can consist entirely of integrated circuitry within a circuit board capable of performing a specified function.

The command processor 230 can maintain and control circuitry within the remote receiver 205. For example, in one embodiment where the remote receiver 205 starts and stops a device, the command processor 230 can determine that the current state of the controlled device is an off state. Accordingly, the command processor 230 can assure that the next activation of the actuator 215 will cause the device to be placed in an on state. The command processor 230 can make such determinations by either receiving data from the controlled device or by inferring the state of the controlled device based upon activities occurring within the remote receiver 205. For example, if the actuator 215 is in an active position, the command processor 230 can infer that a controlled device is turned on. Furthermore, in another embodiment, the command processor 230 can send remote receiver 205 status information to the signal processor 220 to be conveyed to a querying device. In yet another embodiment, the command processor 230 can activate/deactivate a remote receiver 205 in order to prevent unauthorized remote operations.

The security manager 225 can contain security related information used or needed by the remote receiver 205. This security information may be necessary to perform functions within the remote receiver 205. For example, in one embodiment, the only status queries that the remote receiver 205 can respond to require authorization by the security manager 225. In another embodiment, authorization by the security manager 225 is a prerequisite to activating the actuator 215.

Notably, the security manager 225 can function in conjunction with an external call authorizer, as well as function independently. For example, in a particular embodiment, the security manager 225 can transmit an authorization requirement to the signal processor 220 that can be conveyed to the call authorizer 170, shown in FIG. 1. In such an embodiment, the call authorizer 170 can thereafter perform the authorization tasks for the remote receiver 205. In another embodiment, both the call authorizer 170 and the security manager 225 can perform authorization checks independent of one another. For instance, the authorization requirement contained within the call authorizer 170 can be established and modified independent of security features contained within the remote receiver 205. In yet another embodiment, the security manager 225 can perform remote receiver 205 authorizations for an overall system that does not include a call authorizer.

In operation, a digitally encoded authorization signal can be sent from a switch across a telecom network through a telephone line 265 to the remote receiver 205. This authorization signal can be conveyed through the data conduit 250 to the signal processor 220 which can decode the information within the authorization signal. This decoded information can be sent to the security manager 225 for authorization. If authorization is denied, the security manager 225 can cause the signal processor 220 to transmit a signal indicating to the requesting party that access has not been authorized. If the security manager 225 approves access, a signal can be sent to the command processor 230 denoting that access has been authorized.

Up to this point, the remote receiver 205 can be in a disabled state. Such a state can be established by the command processor 230 which can be powered by the receiver power generator 210 through the span power conduit 245. When the security manager 225 sends an access approval to the command processor 230, the command processor 230 can place the remote receiver 205 in an enabled state. Accordingly, the command processor 230 can record the present system status, which can indicate that a controlled device is in a "locked" position. Thereafter, the command processor 230 can enable the actuator 215, allowing the actuator 215 to receive ring voltage from the ring voltage conduit 240. Furthermore, the actuator can be adjusted to perform an "unlock" operation upon receiving current.

Then, a ring signal including ring voltage, can be conveyed to the remote receiver 205. This ring voltage can activate the actuator 215 causing the active mechanism 235, which can be a lock, to become unlocked. As soon as the system state is changed, an indication can be sent to the command processor 230. The command processor 230 can record the change in system state and adjust the actuator 215 to lock the active mechanism 235 whenever it is next triggered. Thereafter, the command processor 230 can deactivate the remote receiver 205 so that unauthorized parties cannot utilize the remote receiver's functions.

One of ordinary skill in the art should appreciate that the receiver power generator 210, the actuator 215, the signal processor, the security manager 225, the command processor 230, and the active mechanism 235 need not be discrete elements within the remote receiver 205. Instead, the remote receiver 205 can itself perform some or all of the functions detailed within the specified elements without grouping the functions in the manner depicted in FIG. 2B. For example, an embodiment can exist where the functions of the command processor 230, the actuator 215, and the active mechanism 235 are intermeshed within a single element such as a microcontroller or application-specific integrated circuit.

Furthermore, not all the functions depicted by the elements detailed in FIG. 2B need be incorporated in all embodiments of the invention. For example, in one embodiment, the remote receiver 205 need not include a signal processor 220. Notably, such a system may not be capable of encoding or decoding digital information contained within data signals. Nevertheless, the remote receiver 205 can be activated whenever a ring voltage is sent via the ring voltage conduit 240 and perform a function upon a controlled device. In another embodiment, the remote receiver 205 can lack a receiver power generator 210. Such a remote receiver 205 can provide constant power to circuitry through a battery source.

Figure 3:
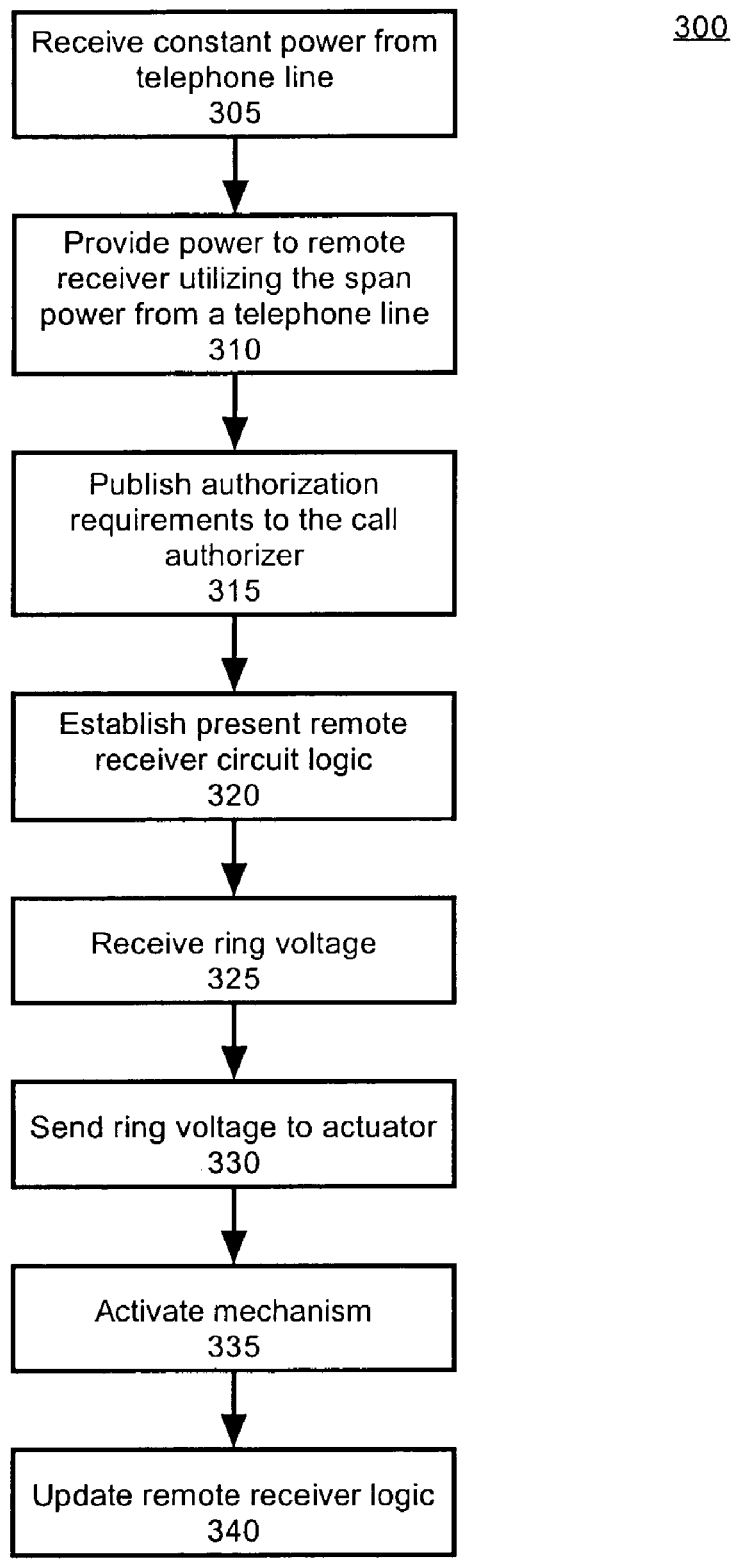
FIG. 3 is a flow chart illustrating a method of using a remote receiver using the system of FIG. 2B.

FIG. 3 is a flow chart illustrating a method 300 for utilizing a remote receiver using the system of FIG. 2B. The method 300 can be performed in the context of a remote receiver connected to a physical telephone line from which the power requirements of the remote receiver are obtained. The method 300 can begin in step 305 where the remote receiver can receive constant power from span power within a telephone line. In step 310, this constant power feed can provide the remote receiver with the necessary power to perform basic functions. Notably, additional power sources, such as a backup battery or a series of capacitors, can be used.

In step 315, the remote receiver can publish call restrictions to an external call authorizer. This publication can occur automatically upon first powering up the remote device or can be responsive to a query from the call authorizer. Such a publication can occur by sending telephony signals containing digitally encoded information to the call authorizer. It should be noted that the invention can utilize both pre-connection and post connection telephony signals.

In step 320, the remote receiver can determine a present system state and set internal circuit logic. For example, if a remote receiver opens/closes a gate, the remote receiver can determine that the gate is presently closed. Subsequently, the receiver can set circuit logic so that a gate opening event occurs whenever the remote receiver receives a ring signal. In another embodiment, the circuit logic can be set to an inactive state until security restrictions of the remote receiver are satisfied.

In step 325, the remote device can receive a ring voltage signal. This ring voltage signal can be sent to the actuator in step 330. In embodiments where the remote receiver is not connected to power from a phone line, the ring signal can still trigger the actuator that can be linked to a battery or external power source. Once powered, the actuator can activate or manipulate a mechanism in step 335. This mechanism can include, but is not limited to, locking/unlocking mechanisms, gate opening/closing mechanisms, and engine shut-off/turn on mechanisms. A given remote receiver can also have multiple actuators and active mechanisms governed by internal circuit logic.

In step 340, the circuit logic of the remote device can be updated responsive to the activation of step 335. It should be noted that not all embodiments perform all the steps indicated in FIG. 3. For example, an embodiment that does not interoperate with a call authorizer would not perform step 315. Similarly, an embodiment that utilizes a battery to provide constant power need not perform step 310.

Figure 4:
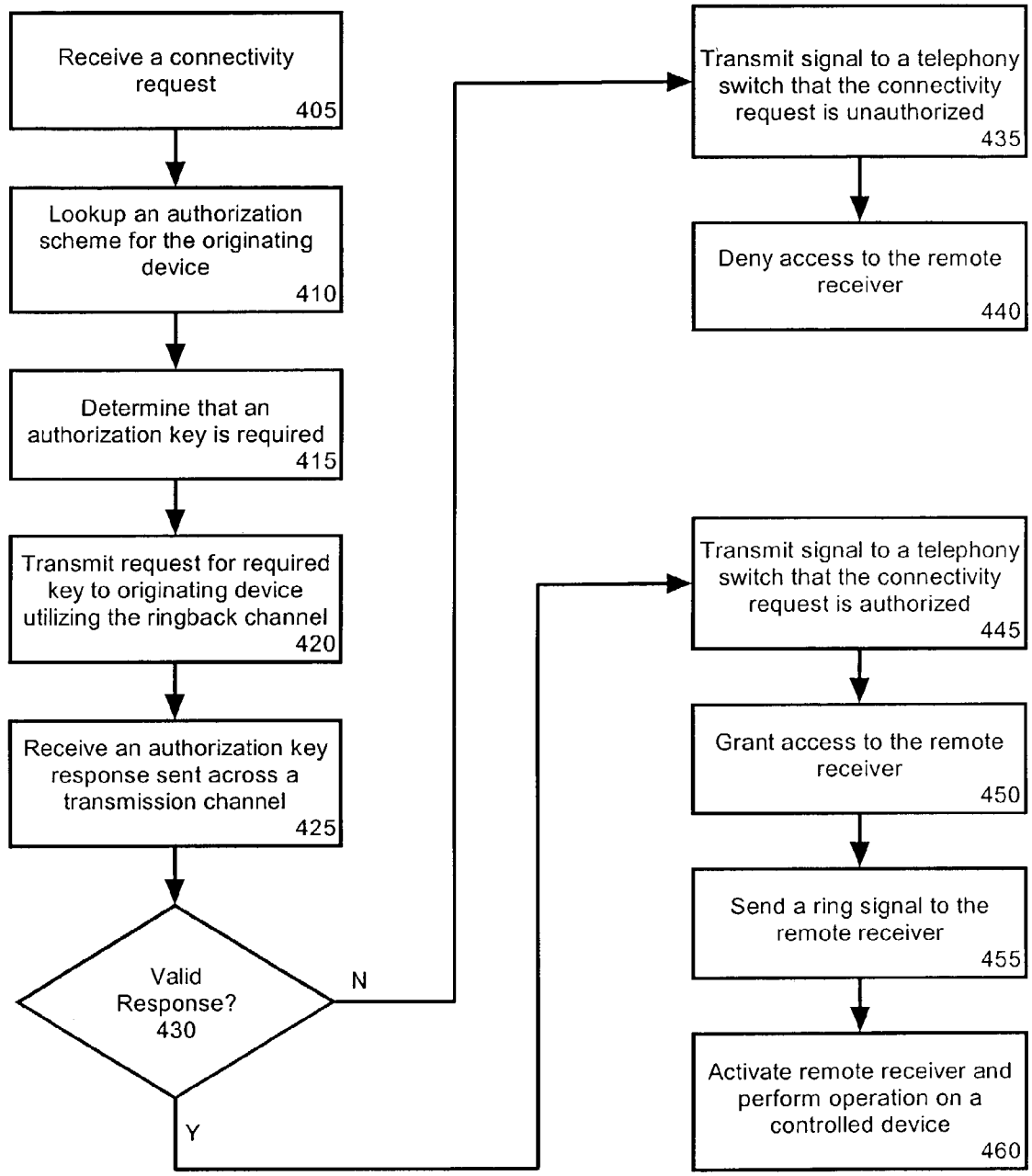
FIG. 4 is a flow chart illustrating a method for implementing a remote receiver in conjunction with a call authorizer using the system of FIG. 1.

FIG. 4 is a flow chart illustrating a method 400 for implementing a remote receiver in conjunction with a call authorizer using the system of FIG. 1. The method can be performed in the context of pre-connection call authorization where an originating party using an originating device attempts to trigger a remote receiver. Moreover, the method presupposes the existence of a call authorizer that utilizes a cryptography key scheme to authorize calls. The method 400 can begin in step 405 where a call authorizer receives a connectivity request.

In step 410, the call authorizer can access a data storage area to determine what authorization scheme, if any, is associated with the remote receiver. Authorization schemes can vary according to a telephone number associated with a remote receiver. In step 415, a determination can be made in reference to the authorization scheme accessed that an authorization key is required. Accordingly, some cryptography key, such as a public key, can be required before a connection to the remote receiver is permitted.

In step 420, the call authorizer can transmit a request for a required key to the originating device through a ringback channel. In step 425, an authorization code can be received through the CNG channel. Notably, the authorization code can contain a digitally encoded signature that results from the originating device decrypting the cryptography key sent within the authorization request. In certain embodiments, the original connection request sent from the originating device can include an authorization code containing either a password or a previously determined digitally encoded signature. In such an embodiment, step 420 can be rendered unnecessary and can be skipped by the method 400.

In step 430, the method can compare the authorization code with a desired response and determine if authorization should be granted. If the authorization code does not satisfy the requirements of the call authorizer, the method can proceed to step 435, where the call authorizer can signal that the connectivity request is unauthorized. In step 440, the authorization manager can then deny access to the remote receiver.

If the authorization code indicates authorization should be granted, however, the method can proceed to step 445, where the call authorizer can signal that the connectivity request is authorized. In step 450, the ringback processor can grant access to the remote receiver. In step 455, a ring signal can be sent to the remote receiver. The ring voltage from the ring signal can activate an actuator within the remote receiver. In step 460, the remote receiver can be activated and perform an operation on a controlled device. For example, a device can be opened/closed, locked/unlocked, or started/stopped.

Figure 5:
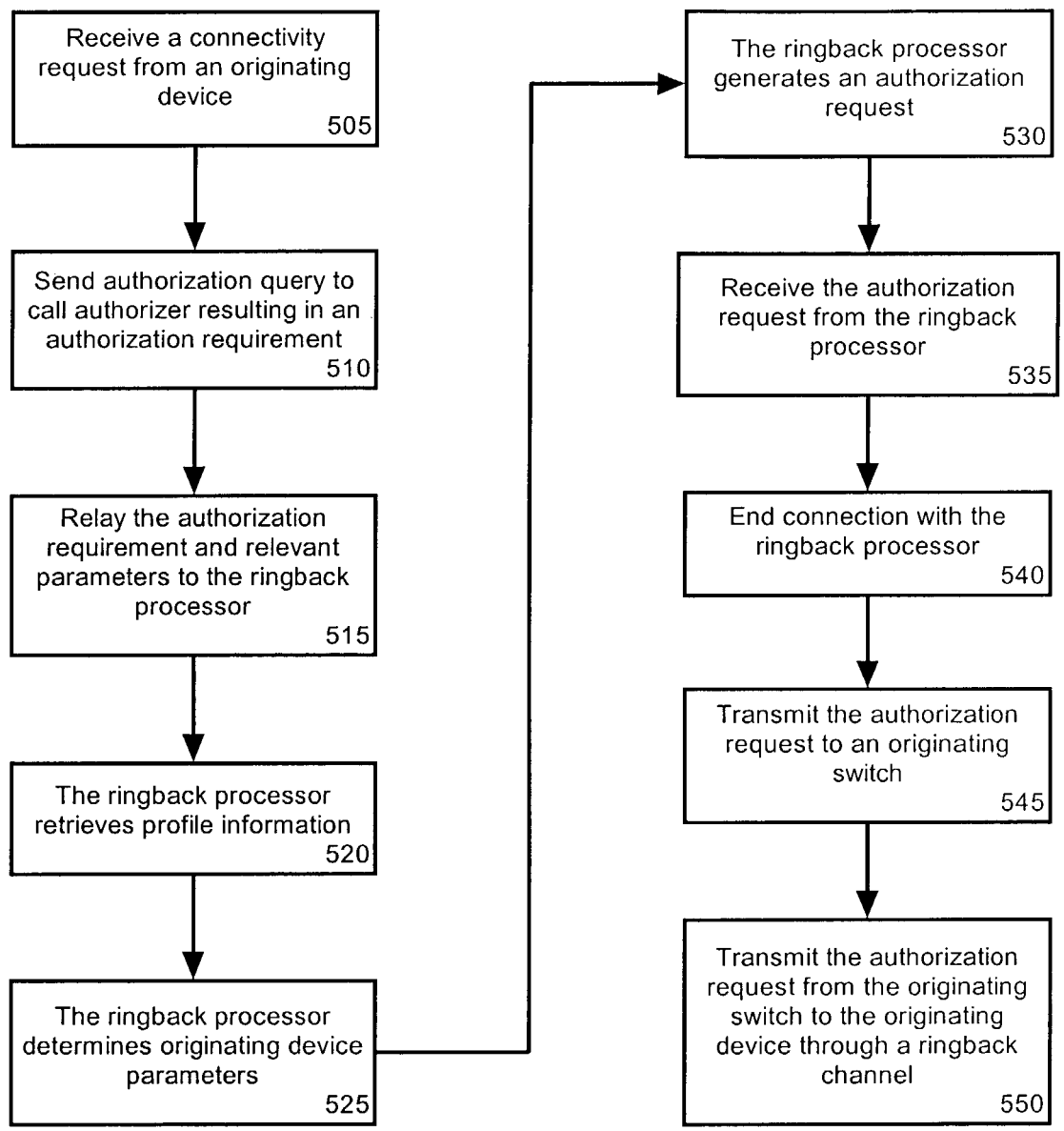
FIG. 5 is a flow chart illustrating a method for utilizing a ringback channel to transmit an authorization request using the system of FIG. 1.

FIG. 5 is a flow chart illustrating a method 500 for utilizing a ringback channel to transmit an authorization request using the system of FIG. 1. The method 500 can be performed in the context of an attempted telephony connection. The method 500 begins in a state before a connection is established between an originating device and a remote receiver. The method assumes that a telephony environment exists where a communication pathway is available to a destination switch through which the destination switch can relay a ringback transmission to an originating device.

The method 500 can begin in step 505, where a destination switch receives a connectivity request from the originating device. While in many cases, the connectivity request will be for a dedicated circuit-switched voice connection, the method can operate equally as well within a packet-switched environment. In step 510, the method can send an authorization query to the call authorizer. The call authorizer can determine from the authorization query that additional information is needed from the originating device before authorization can be granted. Accordingly, an authorization requirement can be generated that details the necessary additional information.

In step 515, the authorization requirement and relevant parameters can be relayed from the call authorizer to the ringback processor. The ringback processor can generate a signal configured to prompt a user of the originating device for the necessary additional information specified by the authorization requirement. This signal generated by the ringback processor can be called an authorization request. Relevant parameters can include, but are not limited to, originating device identification parameters, remote receiver parameters available to the destination switch, and special processing parameters related to the authorization requirement.

In step 520, the ringback processor can retrieve profile information concerning the remote receiver. For example, profile information can include, but is not limited to, such information as the called telephone number, the calling telephone number, the nature of the remote receiver, capabilities of the controlled device, remote receiver options, security requirements for establishing a connection, and unique connection requirements. The profile information can be located in an external data store, can be contained within the ringback processor, or can be contained within parameters passed to the ringback processor.

In step 525, the ringback processor can determine originating device parameters. In one embodiment, the type of authorization request can be modified according to the capabilities of an originating device. For example, if an originating device is configured to accept a digitized authorization key, such a key can be constructed and sent to the originating device. If the originating device is not configured to accept such a key, however, an analog voice signal can be generated requesting that a user of the originating device provide authorization data as specified by the authorization requirement.

In step 530, the ringback processor can generate an authorization request. This authorization request can include analog and/or digital signals. In step 535, the ringback processor can send the authorization request to the destination switch. Thereafter, in step 540 the connection with the ringback processor can be terminated. In step 545, the ringback transmission can be relayed through the telephony network to the originating switch. Notably, if the originating device and remote receiver are both connected to the same switch, step 545 is unnecessary. In step 550, the originating switch can transmit the authorization request to the originating device through a designated ringback channel. This ringback channel can be a frequency range within the voice band designated for ringback signals.

It should be appreciated that while the embodiment described in FIG. 5 includes a ringback processor and extensively utilized its capabilities to transmit the authorization request to the originating device, the invention does not require a separate ringback processor. Instead, the functionality attributed to the ringback processor in FIG. 5 can be incorporated within the call authorizer.

Figure 6:
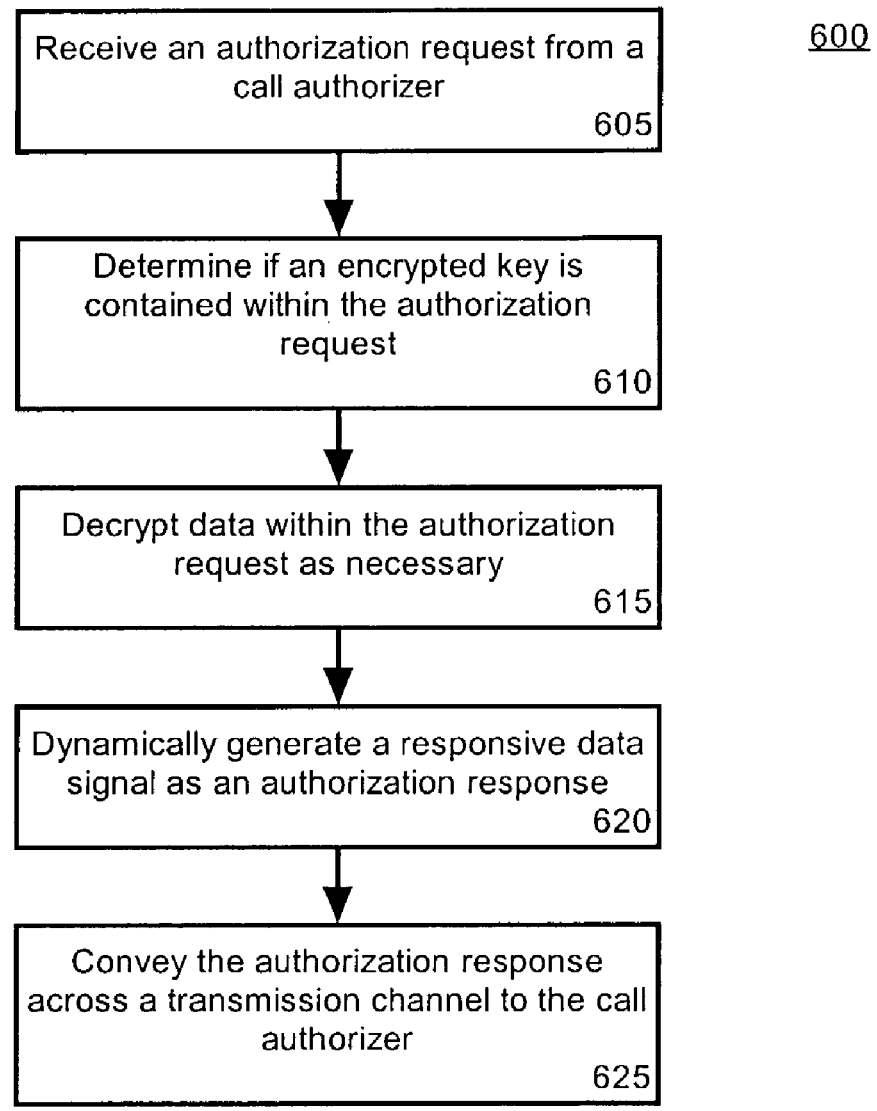
FIG. 6 is a flow chart illustrating a method for utilizing a CNG channel to send an authorization code to a call authorizer using the system of FIG. 1.

FIG. 6 is a flow chart illustrating a method 600 for utilizing a CNG channel to send an authorization code to a call authorizer using the system of FIG. 1. The method 600 can be performed in the context of pre-connection telephony signaling from an originating device to a call authorizer. Furthermore, the method 600 presupposes that the call authorizer submits to an originating device an authorization request containing an encrypted key used to construct an authorization code. The method 600 can begin in step 605 where the originating device receives an authorization request from the call authorizer. This authorization request can be transmitted across a ringback channel.

In step 610, the originating device can determine if an encrypted key is contained within the authorization request. In step 615, the originating device can decrypt data contained within the authorization request as necessary. Notably, cryptography schemes such as symmetric keys and public keys can be utilized for the decryption process within method 600. In embodiments utilizing key encryption, the originating device can contain a decryption key capable of accessing the data from within the authorization request. In other embodiments, the authorization request can prompt the originating device for a particular code or password required by the call authorizer.

Once necessary decryption actions have been taken, the method can proceed to step 620, where a data signal can be responsively generated. This data signal can be the authorization code that the call authorizer has requested. In step 625, the method can convey this data signal across a CNG channel. Notably, the conveyance of the data signal, as well as all previously mentioned steps, can occur before a voice connection is established between the originating device and the remote receiver. Additionally, the CNG channel across which the data signal is conveyed can be the previously detailed frequency range centered at or around 1,100 Hz.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for implementing a remote receiver connected to a telephony network comprising the steps of:
    accessing remote receiver specific information, wherein the remote receiver specific information includes an authorization requirement;
    receiving a digitally encoded signal specifying an authorization code;
    prior to a telephony connection being established between the remote receiver and an originating device, determining whether the authorization code satisfies the authorization requirement;
    responsive to said determining step, sending a ringing signal via a telephone line to the remote receiver;
    powering an actuator within the remote receiver with a voltage from the ringing signal to activate a device controlled by the remote receiver
    acquiring from the remote receiver a digital signal; and
    modifying the remote receiver specific information responsive to said acquiring step.

2. The method of claim 1, further comprising the step of:
    powering circuitry within the remote receiver other than the actuator with span power from the telephone line.

3. The method of claim 1, said activating step further comprising the step of:

altering a lock state of the device, wherein the lock state is selected from the group consisting of locked and unlocked.

4. The method of claim 1, said activating step further comprising the step of:
altering an access state of the device, wherein the access state is selected from the group consisting of opened and closed.

5. The method of claim 1, said activating step further comprising the step of:
altering an operational state of the device, wherein the operational state is selected from the group consisting of started and stopped.

6. The method of claim 1, said receiving step further comprising the step of:
receiving said authorization code via a CNG channel.

7. The method of claim 6, wherein the CNG channel is within the frequency range of 900–1,300 Hz.

8. The method of claim 1, further comprising the step of:
transmitting an authorization request to the originating device responsive to a connectivity request, wherein said receiving step is responsive to said transmitting step.

9. The method of claim 8, wherein said transmitting step further comprises the step of:
including an encrypted key within the authorization request.

10. The method of claim 8, wherein said transmitting step further comprises the step of:
transmitting the authorization request via a ringback channel.

11. A method of utilizing a remote receiver comprising the steps of:
receiving a digitally encoded signal via a telephone line specifying data for the remote receiver;
decoding the digitally encoded signal;
acquiring a ringing signal via the telephone line;
powering an actuator with a voltage from the ringing signal to perform a predefined function upon a controlled device.
acquiring from the remote receiver a digital signal; and,
updating remote receiver specific information in the remote receiver responsive to acquiring the digital signal.

12. The method of claim 11, wherein the predefined function of said powering step is selected from the group consisting of a locking function, an unlocking function, an opening function, a closing function, a starting function, and a stopping function.

13. The method of claim 11, wherein said digitally encoded signal specifies an authorization code, wherein said method further comprises the step of:
authorizing access to the remote receiver based on the authorization code.

14. The method of claim 11, wherein said digitally encoded signal specifies a remote receiver command, and wherein said method further comprises the step of:
executing the remote receiver command resulting in a functional change within the remote receiver.

15. The method of claim 11, wherein the digitally encoded signal is a pre-connection telephony signal.

16. The method of claim 11, further comprising the step of:
powering circuitry within the remote receiver other than the actuator with span power from the telephone line.

17. The method of claim 11, further comprising the steps of:
digitally encoding information specifying remote receiver data into a receiver signal; and,
transmitting the receiver signal via the telephone line.

18. A system for remote controlling a device through telephony signals comprising:
a call authorizer communicatively linked to a telephony network, configured to send and receive digitally encoded pre-connection telephony signals specifying authentication information; and,
a remote receiver communicatively linked to said call authorizer via a telephone line, said remote receiver containing a switching mechanism which is powered by a ring voltage received through the telephone line
wherein said call authorizer is further configured to generate a digitally encoded signal specifying an encrypted key that must be decrypted by an originating device before a telephony connection is established between the originating device and said remote receiver.

19. The system of claim 18, wherein said call authorizer is a network element within a telephony network.

20. The system of claim 19, wherein said call authorizer is a switch independent application.

21. The system of claim 17, said remote receiver further comprising:
a receiver power generator configured to power circuitry within said remote receiver utilizing span power from the telephone line.

22. The system of claim 17, said remote receiver further comprising:
a command processor configured to alter at least one function performed by said remote receiver whenever said remote receiver is activated.

23. The system of claim 17, said remote receiver further comprising:
a security manager comprising security information about accessing said remote receiver, said security manager configured to convey a digitally encoded signal specifying at least a portion of the security information to said call authorizer.

24. A remote receiver comprising:
a signal processor communicatively linked to a telephony network, configured to send and receive digitally encoded telephony signals specifying remote receiver information;
an actuator powered by a ring voltage received via a telephone line, configured to trigger a change within a controlled device when the remote receiver receives a ring signal;
a security manager configured to perform authorization tasks within the remote receiver, wherein at least one function within the remote receiver cannot be accessed without prior authorization being granted by said security manager.

25. The remote receiver of claim 24, wherein at least one of the digitally encoded telephony signals is a pre-connection telephony signal.

26. The remote receiver of claim 24, further comprising:
a receiver power generator configured to power the remote receiver utilizing span power from the telephone line.

27. The remote receiver of claim 24, further comprising:
a command processor configured to alter at least one function performed by the remote receiver whenever the remote receiver is activated.

28. A machine readable storage having stored thereon, a computer program having a plurality of code sections, said code sections executable by a machine for causing the machine to perform the steps of:

accessing remote receiver specific information, wherein the remote receiver specific information includes an authorization requirement;

receiving a digitally encoded signal specifying an authorization code; via a CNG channel;

prior to a telephony connection being established between the remote receiver and an originating device, determining whether the authorization code satisfies the authorization requirement;

responsive to said determining step, sending a ringing signal via a telephone line to the remote receiver; and, powering an actuator within the remote receiver with a voltage from the ringing signal to activate a device controlled by the remote receiver.

29. The machine readable storage of claim 28, further comprising the step of:

powering circuitry within the remote receiver other than the actuator with span power from the telephone line.

30. The machine readable storage of claim 28, said activating step further comprising the step of:

altering a lock state of the device, wherein the lock state is selected from the group consisting of locked and unlocked.

31. The machine readable storage of claim 28, said activating step further comprising the step of:

altering an access state of the device, wherein the access state is selected from the group consisting of opened and closed.

32. The machine readable storage of claim 28, said activating step further comprising the step of:

altering an operational state of the device, wherein the operational state is selected from the group consisting of started and stopped.

33. The machine readable storage of claim 28, wherein the CNG channel is within the frequency range of 900–1,300 Hz.

34. The machine readable storage of claim 28, further comprising the step of:

transmitting an authorization request to the originating device responsive to a connectivity request, wherein said receiving step is responsive to said transmitting step.

35. The machine readable storage of claim 34, wherein said transmitting step further comprises the step of:

including an encrypted key within the authorization request.

36. The machine readable storage of claim 34, wherein said transmitting step further comprises the step of:

transmitting the authorization request via a ringback channel.

37. The machine readable storage of claim 28, further comprising the step of:

acquiring from the remote receiver a digital signal; and, modifying the remote receiver specific information responsive to said acquiring step.

38. A machine readable storage having stored thereon, a computer program having a plurality of code sections, said code sections executable by a machine for causing the machine to perform the steps of:

receiving a digitally encoded signal via a telephone line specifying data for a remote receiver;

decoding the digitally encoded signal;

acquiring a ringing signal via the telephone line;

powering an actuator with a voltage from the ringing signal to perform a predefined function upon a controlled device acquiring from the remote receiver a digital signal; and, modifying the remote receiver specific information responsive to said acquiring the digital signal.

39. The machine readable storage of claim 38, wherein the predefined function of said powering step is selected from the group consisting of a locking function, an unlocking function, an opening function, a closing function, a starting function, and a stopping function.

40. The machine readable storage of claim 38, wherein said digitally encoded signal specifies an authorization code, the machine readable storage further causing the machine to perform the step of:

authorizing access to the remote receiver based on the authorization code.

41. The machine readable storage of claim 38, wherein said digitally encoded signal specifies a remote receiver command, and wherein the machine readable storage causes the machine to perform the step of:

executing the remote receiver command resulting in a functional change within the remote receiver.

42. The machine readable storage of claim 38, wherein the digitally encoded signal is a pre-connection telephony signal.

43. The machine readable storage of claim 38, further comprising the step of:

powering circuitry within the remote receiver other than the actuator with span power from the telephone line.

44. The machine readable storage of claim 38, further comprising the steps of:

digitally encoding information specifying remote receiver data into a receiver signal; and, transmitting the receiver signal via the telephone line.

* * * * *